United States Patent
Heyring et al.

(10) Patent No.: US 8,997,662 B2
(45) Date of Patent: Apr. 7, 2015

(54) STABILISATION OF OBJECTS

(75) Inventors: Christopher Brian Heyring, Eagle Bay (AU); Jonathan Ramsey Beames, Dunsborough (AU); John Gerard Catoni, Dunsborough (AU); Toby William Heyring, Eagle Bay (AU); Richard Monk, Busselton (AU)

(73) Assignee: No Rock Café Tables Pty Ltd., Eagle Bay (AU)

( * ) Notice: Subject to any disclaimer, the term of this patent is extended or adjusted under 35 U.S.C. 154(b) by 115 days.

(21) Appl. No.: 13/518,579

(22) PCT Filed: Dec. 23, 2010

(86) PCT No.: PCT/AU2010/001746
§ 371 (c)(1), (2), (4) Date: Sep. 11, 2012

(87) PCT Pub. No.: WO2011/075794
PCT Pub. Date: Jun. 30, 2011

(65) Prior Publication Data
US 2013/0000529 A1   Jan. 3, 2013

(30) Foreign Application Priority Data

Dec. 24, 2009   (AU) ................................ 2009906289

(51) Int. Cl.
*A47B 3/00*   (2006.01)
*A47B 13/02*   (2006.01)
(Continued)

(52) U.S. Cl.
CPC .................. *A47B 13/02* (2013.01); *A47B 91/16* (2013.01); *F16M 7/00* (2013.01)

(58) Field of Classification Search
CPC .................................. A47B 91/00; A47B 91/16

USPC ......... 312/115, 118, 124, 128, 129, 130, 150; 248/188.3, 188.2, 188.8, 188.9, 248/188.91, 188.7, 165, 166, 170, 171, 436, 248/168, 169; 280/369, 651
See application file for complete search history.

(56) References Cited

U.S. PATENT DOCUMENTS 801,966 A * 10/1905 Breiding ....................... 108/128
2,836,007 A * 5/1958 Dodds ......................... 248/188.3
(Continued)

FOREIGN PATENT DOCUMENTS

FR   2607878 A1   6/1988
FR   2 624 563 B2   6/1989
(Continued)

OTHER PUBLICATIONS

English translation of French Patent 2 624 563 Publication Date: Jun. 16, 1989.
(Continued)

*Primary Examiner* — Daniel J Troy
*Assistant Examiner* — Andres F Gallego
(74) *Attorney, Agent, or Firm* — Cascio & Zervas

(57) ABSTRACT

A support mechanism for supporting an object, such as a table, has at least four legs and an interconnection means connecting the legs. Each leg has a beam portion with an inner end and an outer end. The beam portion of each leg is connected to the interconnection means by a respective pivot having a pivot axis located between the inner and outer ends of the beam portion. Each respective pair of adjacent legs has a protrusion fixed to one of the legs of that pair of adjacent legs and extending from that one leg to act on the other leg of that pair of adjacent legs. In use, the outer end of the beam portion of one leg moves in an upwards direction and the outer end of the beam portions of the adjacent legs moves in a downwards direction to accommodate uneven ground surfaces.

21 Claims, 5 Drawing Sheets

(51) Int. Cl.
 *A47B 91/16* (2006.01)
 *F16M 7/00* (2006.01)

(56) References Cited

U.S. PATENT DOCUMENTS

| | | | | |
|---|---|---|---|---|
| 4,257,618 A | * | 3/1981 | Tax et al. | 280/6.155 |
| 5,365,862 A | * | 11/1994 | Peterson | 108/147 |
| 5,690,303 A | * | 11/1997 | Winters | 248/188.3 |
| 6,216,887 B1 | * | 4/2001 | Soo | 211/85.7 |
| 8,607,715 B2 | * | 12/2013 | Catoni et al. | 108/150 |

FOREIGN PATENT DOCUMENTS

| | | | |
|---|---|---|---|
| FR | 2 902 620 B3 | 12/2007 | |
| WO | 00/69312 A1 | 11/2000 | |
| WO | 2005/084491 A1 | 3/2005 | |

OTHER PUBLICATIONS

English translation of French Patent 2 902 620 Publication Date: Dec. 28, 2007.

Extended Search Report EPO Application No. 10838434.8-1653 / 2515709 PCT/AU/2010001746 Apr. 17, 2013.

English translation of French Patent 2607878 Publication Date: Jun. 10, 1988.

* cited by examiner

STABILISATION OF OBJECTS

FIELD OF THE INVENTION

The present invention relates to the stabilisation of objects, such as freestanding furniture and appliances.

BACKGROUND TO THE INVENTION

Many objects such as items of furniture (ie tables, chairs and benches) and white goods are supported at at least four points of contact with the ground or floor (e.g. using ground engaging means such as legs, feet or wheels). These objects are used in a wide range of situations and in many cases the surface on which the object is stood is uneven or not a perfectly flat plane. To prevent, for example, furniture from rocking on an uneven surface it is common for small tables or stools to use three legs since three points are sufficient to define a linear plane and therefore provide location of the object without rocking. However, there are many reasons why three legs are undesirable on many objects, particularly those having a quadrilateral shape in plan view such as square or rectangular topped tables where four legs are generally preferred, located towards each corner, with more than four legs occasionally being desired or even required for larger tables. The use of four or more legs of equal length rigidly attached to and supporting a flat table top restricts the feet of the table to lie in a flat plane, so they are unable to all contact the ground simultaneously when the surface is uneven. This causes the table to be unstable and rock, which is most noticeable in four-legged tables with small table tops.

There are numerous applications requiring a support mechanism that is uncomplicated and robust, but can have four or more legs which adapt to uneven surfaces to provide stability.

BRIEF DESCRIPTION OF THE DRAWINGS

In U.S. Pat. No. 3,814,362, a table is shown having four L-shaped legs with the vertical portion of each leg located towards the centre of the table, two adjacent legs are fixed to each other and the table top. The other pair of adjacent legs are fixed to each other and pivotally connected to the lower end of the vertical portion of the fixed pair of legs such that relative rotation about the pivot provides adjustment of the four feet to uneven surfaces. The relative rotation is permitted or locked by additional mechanisms. However, the relative rotation of the pairs of legs can provide a misaligned or unattractive look to the table and user intervention is required to operate the additional locking mechanisms.

French Publication Numbers 2 902 619 and 2 902 620 show mechanisms to permit vertical displacement of the four corner legs of a square or rectangular table. The arrangements disclosed maintain the angle of each leg perpendicular to the table top (which is very good for aesthetics) even when the legs have displaced to contact a very uneven surface. However, the linkages used involve an excessive quantity of individual links and joints making them complex and either heavy or fragile.

Figure 1:
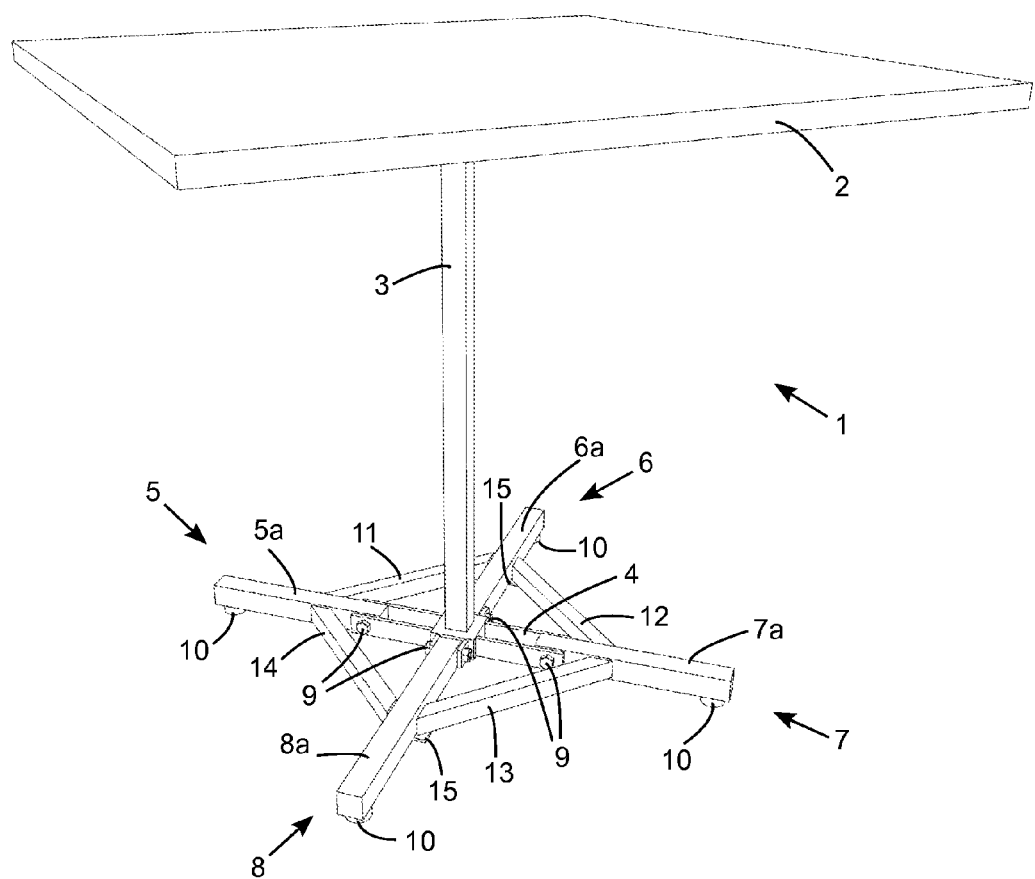

Canadian Patent Application Number 2,216,869 shows a flexible base for rolling chairs and workstools. Each castor is mounted at the lower end of a T-shaped arm 14, the arm 14 being able to rotatably fixed to the base about axis 24 (along the top bar of the T). Additional T-shaped bridge elements 26 are utilised which can pivot relative to the base about axis 34 (along the vertical bar of the T), the ends of the top bar engaging the T-shaped arms 14 of adjacent castors. Thus the mechanism permits vertical displacement of adjacent castors in opposing vertical directions to maintain contact with uneven surfaces, thereby preventing rocking and providing stability. However, the arrangement is complex having a large number of parts and a large number of joints.

It is therefore a preferred object of the invention to provide a support mechanism having four or more legs which can adapt to uneven surfaces utilising a uncomplicated mechanism.

It is a preferred object of the invention that the mechanism self adjust to the uneven surface without requiring operator intervention.

It is an optional object of the invention to provide a travel stop to limit excess articulation of the mechanism without requiring operator intervention.

SUMMARY OF THE INVENTION

With this in view, according to one aspect of the present invention there is provided a support mechanism for supporting an object, the support mechanism including at least four legs and an interconnection means connecting the at least four legs. Each leg has at least a beam portion having an inner end and an outer end. The beam portion of each leg is connected to the interconnection means by a respective pivot having a pivot axis, the pivot being located between the inner and outer ends of the beam portion. The pivot axes of the at least four legs may form a polygon in plan view. A protrusion is provided between each respective pair of adjacent legs, each protrusion being fixed to one leg of said pair of adjacent legs and extending from that one leg to act on the other leg of said pair of adjacent legs, such that a support reaction force is transmitted between the pair of adjacent legs at a point on the other leg between the pivot and the outer end of the beam portion of that other leg, said point being on the opposite side of the pivot axis of the one leg to the outer end of the beam portion of that one leg, such that when in use the outer end of the beam portion of one leg moves in an upwards direction, the outer end of the beam portion of the other leg of the adjacent pair of legs moves in a downwards direction.

This mechanism is thereby able to conform to uneven surfaces. If only four legs are provided the load on each leg is substantially unaffected by the magnitude of warp of the uneven surface.

The pivot of each leg may be located between the pivot axes of two adjacent legs. This keeps the pivots between the legs and the interconnection means compact, allowing the interconnection means to be small and make efficient use of material.

Four legs may be provided being first, second, third and fourth legs, the pivot axes of the respective legs forming a quadrilateral in plan view. The pivot of each respective leg may be located on a respective side of the quadrilateral, i.e. the pivot of each leg may be located between the pivot axes of the pivots of the two adjacent legs. The legs may be arranged around the interconnection means in the order first, second, third then fourth, such that in plan view, the beam portions of the first and third legs are on opposing sides of the interconnection means and the second and fourth leg beam portions are on opposing sides of the interconnection means. The beam portions of the first and third legs may in plan view be parallel to each other in use and similarly the second and fourth leg beam portions may in plan view be parallel to each other and perpendicular to the first and third leg beam portions in use. The beam portions of the legs may form a cross in plan view. The pivot axes may form a square or a rectangle in plan view.

Where four legs are provided (first, second, third and fourth, in order around the interconnection means) the respective protrusions may comprise a first protrusion between the first and second leg, a second protrusion between the second and third leg, a third protrusion between the third and fourth leg and a fourth protrusion between the fourth and first leg, each protrusion ensuring substantially opposite vertical motion of the second ends of the beam portions of the associated legs.

In a first possible four leg arrangement, the first and second protrusions may extend from the second leg and the third and fourth protrusions may extend from the fourth leg, the first protrusion being fixed to the second leg and acting on the first leg, the second protrusion being fixed to the second leg and acting on the third leg, the third protrusion being fixed to the fourth leg and acting on the third leg, and the fourth protrusion being fixed to the fourth leg and acting on the first leg.

Alternatively, in a second possible four leg arrangement the first protrusion may extend from the first leg, the second protrusion may extend from the second leg, the third protrusion may extend from the third leg and the fourth protrusion may extend from the fourth leg.

The interconnection means may be connected directly or indirectly to the object to be supported. The interconnection means may include a base portion to which the beam portions of the legs are pivotally connected. The interconnection means may include a vertical stem or support member.

The interconnection means may be connected to a table top to provide support therefore, i.e. the object being supported is a table top. The interconnection means may include a folding mechanism or be connected to a folding mechanism such that the table top can be folded for storage.

Alternatively when the interconnection means are directly connected to the object to be supported, the interconnection means may even be part of the object to be supported, for example where there are four legs provided, there may be one or more protrusions extending down from (or even moulded into) the underside of the object, the protrusions providing the pivot locations to which the respective beam portions are connected. If the object being supported is a table top, each leg may include a respective downwards extending portion (i.e. the mechanism is under the table top and the legs include ground engaging portions extending downwards to the ground).

A travel limit may be provided and this may be fixed in operation relative to the interconnection means to provide a physical limit to the rotation of each leg about its pivot axis to thereby limit an articulation or warp displacement of the legs. This travel limit may for example be provided by a plate covering at least a portion of the mechanism, or by the underside of the object being supported.

The pivot axis of each pivot may be substantially horizontal. The pivot axis may also preferably be substantially perpendicular to the beam portion. The beam portion of each leg may be substantially horizontal in use.

Each leg may include a ground engaging portion connected to the outer end of the beam portion of that leg. Additionally or alternatively, each leg may include a ground engaging portion extending downwards to a ground contact point, in use the ground contact point being located on the same side of the pivot axis of that leg as the outer end of the beam portion in plan view.

One or more forms of the present invention may provide a table adaptable to uneven surfaces, the table including first, second third and fourth legs connected to a table top by interconnection means. Each leg may include a beam portion having an inner and an outer end, each beam portion being connected to interconnection means by a pivot having a pivot axis located between the inner and outer ends of the respective beam portion. The pivot axes of the four legs may form a quadrilateral in plan view. A first protrusion is provided between the first and second legs, fixed to the first or second leg and acting on the other of the first or second legs between the pivot and the outer end of the beam portion of said other of the first or second legs. A second protrusion is provided between the second and third legs fixed to the second leg and acting on the third leg between the pivot and the outer end of the beam portion of said third leg. A third protrusion is provided between the third and fourth legs, fixed to the third or fourth leg and acting on the other of the third of fourth legs between the pivot and the outer end of the beam portion of said other of the third or fourth legs. A fourth protrusion is provided between the fourth and first legs, fixed to the fourth leg and acting on the first leg between the pivot and the outer end of the beam portion of said first leg. The first, second, third and fourth protrusions each being provided between adjacent pairs of legs such that upward motion of the outer end of the beam portion of one leg of an adjacent pair causes a downward motion of the outer end of the other leg of that adjacent pair.

Using this arrangement, the legs of the table are thereby able to conform to uneven surfaces and support forces are transferred between the four legs such that the load on each leg is substantially unaffected by the magnitude of warp of the uneven surface.

The pivot of each respective leg may be located on a respective side of said quadrilateral formed by the pivot axes of the legs. This keeps the pivots between the legs and the interconnection means compact, allowing the interconnection means to be small and make efficient use of material.

In one possible arrangement of the table, the first protrusion is fixed to the first leg and acts on the second leg, and the third protrusion is fixed to the third leg and acts on the fourth leg.

In an alternative possible arrangement of the table, the first protrusion is fixed to the second leg and acts on the first leg, and the third protrusion is fixed to the fourth leg and acts on the third leg.

A travel limit may be provided and this may be fixed in operation relative to the interconnection means to provide a physical limit to the rotation of each leg about its pivot axis to thereby limit an articulation or warp displacement of the legs.

The beam portion of each leg may be substantially horizontal in use. Each leg may include a ground engaging portion connected to the outer end of the beam portion.

The interconnection means may include a base portion and a stem portion. In this case, the base portion may interconnect the legs and the stem portion may connect to the table top or to a folding mechanism in the case of a folding table top.

Additionally or alternatively, each leg may include a ground engaging portion extending downwards to a ground contact point, the ground contact point being located on the same side of the pivot axis of that leg as the outer end of the beam portion.

The pivot axes of the four legs may form a square or a rectangle in plan view.

The beam portions of the first and third legs in plan view may be located on opposite sides of the interconnection means and may be parallel to each other in use. Similarly, the second and fourth leg beam portions may be located on opposite sides of the interconnection means and may be parallel to each other and perpendicular to the first and third leg beam portions, i.e. the legs form a cross in plan view.

One or more forms of the present invention provide a support mechanism for an object, the support mechanism including first, second, third and fourth legs connected to an interconnection means. Each leg includes a beam portion having an inner and an outer end, each beam portion being connected to the interconnection means by a pivot having a pivot axis located between the inner and outer ends of the respective beam portion. The pivot axes of the four legs can therefore form a quadrilateral in plan view and the pivot of each respective leg may be located on a respective side of said quadrilateral. The beam portions of the first and third legs are located on opposite sides of the interconnection means in plan view and the beam portions of the second and fourth legs are located on opposite sides of the interconnection means in plan view. The second and fourth legs each further include at least one respective protrusion fixed to the respective beam portion, the at least one protrusion of the second leg acts on the beam portions of both the first and third legs between the pivot and the outer end of the beam portion of each of said first and third legs, and the at least one protrusion of the fourth leg acts on the beam portions of both the first and third legs between the pivot and the outer end of the beam portion of each of said first and third legs. The protrusions of the second and fourth legs each being provided such that upward motion of the outer end of the beam portion of one leg causes a downward motion of the outer end of both adjacent legs.

Using this arrangement, the legs of the table are thereby able to conform to uneven surfaces and support forces are transferred between the four legs such that the load on each leg is substantially unaffected by the magnitude of warp of the uneven surface.

BRIEF DESCRIPTION OF THE DRAWINGS

FIG. 1 is a perspective view of a first possible embodiment of the present invention.

Figure 2:
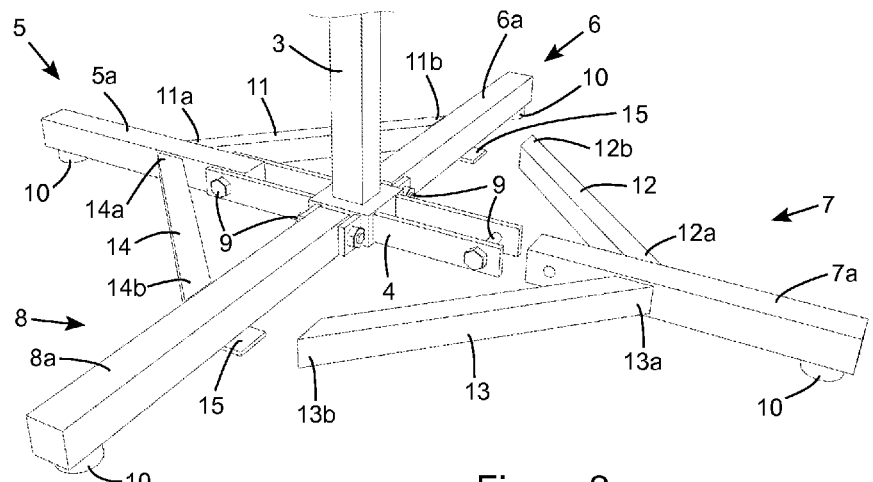

FIG. 2 is a partially exploded view of the mechanism of the first embodiment.

Figure 3:
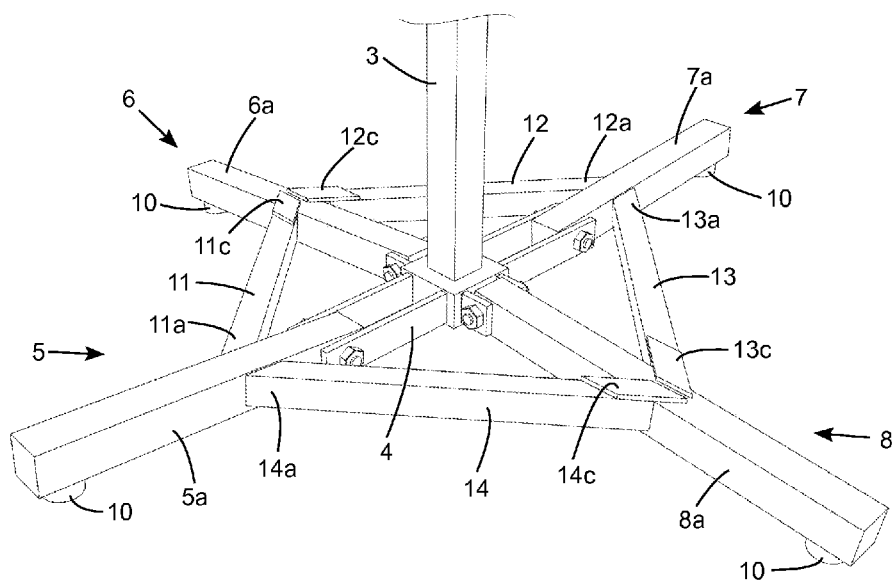

FIG. 3 shows a modification to the first embodiment of the present invention and shows the mechanism adjusted to uneven ground.

Figure 4:
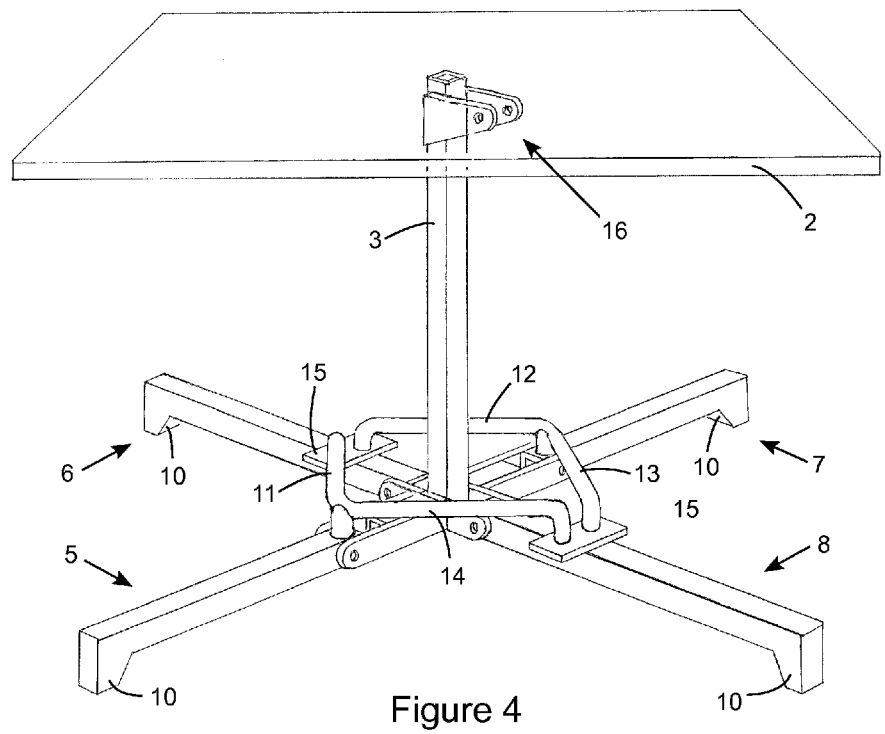

FIG. 4 shows an alternative modification to the first embodiment.

Figure 5:
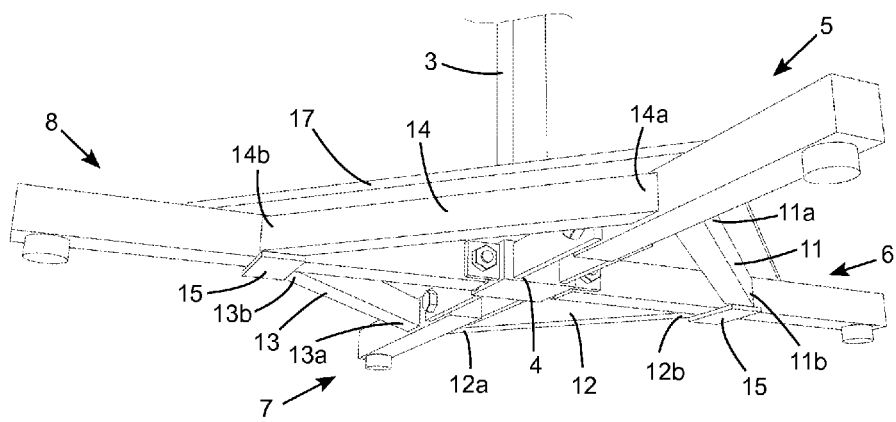

FIG. 5 shows a travel limit modification to the first embodiment.

Figure 6:
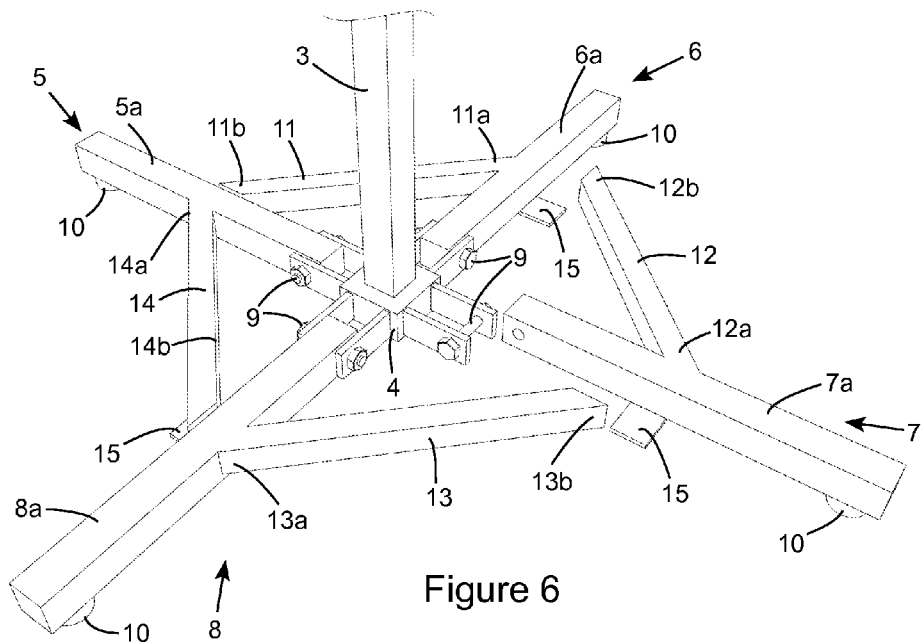

FIG. 6 is a partially exploded view of a second possible embodiment of the present invention.

Figure 7:
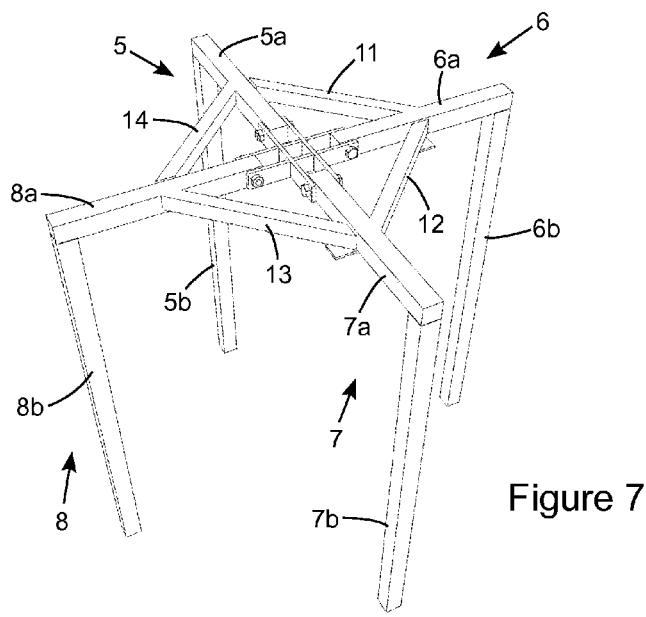

FIG. 7 shows a modification to the second embodiment of the present invention.

DESCRIPTION OF PREFERRED EMBODIMENT

Referring initially to FIG. 1 there is shown a table 1 having a table top 2 supported by a stem or vertical member 3. The lower end of the stem is attached to a base portion 4 to which four table legs 5, 6, 7 and 8 are connected. The legs are shown in two opposing pairs, each leg including a beam portion 5a, 6a, 7a or 8a, being pivotally connected to the base portion 4 by a corresponding bolt 9. A foot 10 is shown on each leg for engaging with the ground. Each foot can be integral with the leg, being a simple as a flat or preferably slightly convex surface to contact the ground, or it can be a separately attached item to allow the foot to be suited to the application (for example a different ground contacting material such as rubber or felt can be bonded to the leg or attached as a replaceable part).

Extending between the beam portion of each pair of adjacent legs is a protrusion (or lever or balance portion) 11, 12, 13, or 14. Two of the protrusions (11 and 14) are fixed to one leg (5) and the other two protrusions (12 and 13) are fixed to the leg (7) on the opposite side of the base (4), each leg of the opposing pair of legs forming a Y-shape. In the other pair of opposing legs (6 and 8) a tab (or plate or small protrusion) 15 is fixed to or extends from both sides of the lower region of the beam portion of each leg between the pivot axis (through bolt 9) and the point of ground contact (foot 10) in plan view.

FIG. 2 shows the base and legs in more detail with one of the Y-shaped legs (7) exploded away from its assembled position. Legs 5 and 7 are the same so can be a common part and legs 6 and 8 are the same so can be a common part. One end 11a, 12a, 13a or 14a of each of the protrusions 11 to 14 is connected or fixed to or part of the associated leg 5 or 7. The distal (or free) end 11b, 12b, 13b or 14b of each protrusion contacts and acts on part of one of the tabs 15 fixed to leg 6 or leg 8. Looking at leg 7, the protrusions 12 and 13 extend from the beam portion 7a such that their distal ends 12b and 13b lie on the opposite side of the pivot axis to the ground contact point or foot 10 in plan view. As the foot 10 of leg 7 moves upwards, the distal ends 12b and 13b of the protrusions therefore move downwards, acting on the tabs 15 on legs 6 and 8 pushing the feet of legs 6 and 8 downwards. Conversely, if the foot 10 of leg 8 moves upwards, the tabs 15 extending from either side of leg 8 act to drive the ends 13b and 14b upwards, the feet of legs 7 and 5 moving downwards (and the foot 10 of leg 6 moving upwards). The mechanism therefore permits motion of the feet of any two adjacent legs in substantially opposite vertical directions whilst simultaneously resisting motion of the feet of any two adjacent legs in the same direction, ie it articulates to conform to uneven surfaces by moving in the warp displacement mode, while providing stability for the object being supported (in this case a table top).

The protrusions (or levers or balance arms) 11-14 extend between each pair of adjacent legs to not only control the relative displacement of adjacent pairs of legs, but also to transmit reaction forces (to react the moments generated by the vertical input forces at the feet 10 about the pivot axes through the bolts 9) between the legs. The protrusions maintain the balance of forces between the two pairs of diagonal legs, ie when one foot is displaced vertically, the load on each foot remains substantially unchanged (as long as the weight of the object, ie the table top and whatever is on it does not change).

As the forces at the free or distal ends of the protrusions act in the same vertical direction to the forces at the feet (to react the moment from the foot on the opposite side of the axis of that leg), and as the feet always experience an upwards force (from the ground) in use, then the protrusions of both of the pair of opposing Y-shaped legs (5, 7) always provide a downwards force (or bear on) both of the other pair of opposing legs.

In FIG. 3, the distal ends of protrusions 11-14 still act on to the top of some part of the legs 6 and 8. However the tabs 15 have been deleted from the legs 6 and 8 and tabs 11c-14c have been added to the distal ends of the protrusions. FIG. 3 also shows the mechanism in an articulated position, i.e. the table is on an uneven surface. The foot of leg 5 is raised upwards pushing the distal tabs 11c and 14c downwards, in turn pushing the legs 6 and 8 downwards relative to the base 4. The load on the foot of leg 7 maintains the tabs 12c and 13c in contact with the legs 6 and 8, the foot of leg 7 moving upwards relative to the base 4.

FIG. 4 shows another adaption to the protrusions of FIGS. 1 to 3, the protrusions 11 and 14 being fixed to the leg 5 at the inner end of that leg, above the pivot. The protrusions can be fixed to the appropriate leg at any point, for example the inner end of the beam portion of leg 5 could extend further inwards towards the stem with the protrusions extending then almost perpendicular to the beam portion of the leg forming a T-shape rather than a Y-shape. The main consideration is that the distal or free end of each protrusion which acts on the adjacent leg is sufficiently spaced the opposite side of the pivot axis to the point where the leg contacts the ground in plan view. In FIG. 4 the plate 15 on each of the adjacent legs 6 and 8 is fixed to or protrudes from the top of the beam portion of each leg. The feet 10 are shown integral with each leg.

The top of the stem 3 includes a pivotal fixing 16 for the table top 2, as any known folding table top mechanism can be utilised to facilitate storage. The legs can also be folded for storage.

FIG. 5 shows the mechanism from FIGS. 1 and 2 and additionally incorporates a top cover 17 over the mechanism. The top cover 17 can be used to hide the mechanism, giving the design a cleaner look. However the top cover 17 can be used to provide a travel stop to limit the motion of the legs. The mechanism provides stability by providing vertical support forces while allowing the four legs to conform to an uneven surface where the four points of contact do not lie in a linear plane, but define a warped plane. It does this through permitting opposite feet to move in a common vertical direction and adjacent feet to move in opposite vertical directions. It can be desirable to limit this articulation or warp motion, for example to prevent the legs from moving so far that the free ends of the protrusions end up underneath the legs 6 and 8, which would otherwise cause the mechanism to operate incorrectly. The top cover 17 is therefore attached to the stem 3 or the base portion 4 at a fixed height, giving a clearance to the legs and protrusions when all the feet of the legs lie in a common linear plane. As the mechanism operates to conform to an uneven surface, the legs or protrusions rotate, reducing their clearance to the top cover until contact is made, limiting travel of the mechanism. This clearance can be designed to permit any desired magnitude of warp motion of the mechanism. A similar underside cover (not shown) can be provided to prevent the legs from folding when the table is lifted off the ground, should that be required.

In FIGS. 1 to 5, the pivot axis of each leg (ie the major axis of each bolt 9) forms a rectangle, although another quadrilateral would be formed if the legs were not arranged in parallel pairs perpendicular to each other and/or if the pivot axis of each leg was not perpendicular to that leg. Preferably, as shown in these figures, the legs in each parallel pair of legs are aligned, forming a cross in plan view and the pivot axis of each leg is horizontal and substantially perpendicular to that leg. Although the pivot axes could form a square, if the mechanism is designed to distribute the loads evenly between the legs and the table or other object being supported is square, the axes will generally be designed to form a rectangle.

In FIG. 6, the fixing of the protrusions between adjacent legs is modified so that one protrusion is fixed to each leg and one protrusion (from an adjacent leg) acts on each leg. One of the legs (7) is exploded away from the assembly, to show that while the protrusion 12 is fixed to the leg 7 as in FIGS. 1 to 5, the protrusion 13 is fixed to the adjacent leg 8 and acts on a tab or plate 15 fixed to the underside of the beam portion of leg 7. One of the benefits of this arrangement is that each leg can be the same. In this case the pivot axis of each leg generally forms a square.

Compared to FIGS. 1 to 5, the position of the fixed end 11a and the free end 11b of protrusion 11 is reversed so that protrusion 11 is fixed to leg 6 rather than leg 5. Similarly, the position of the fixed end 13a and the free end 13b of protrusion 13 is reversed so that protrusion 13 is fixed to leg 8 rather than leg 7. However the arrangement shown in FIG. 6 still operates in a similar manner to that described for the previous figures in that the distal or free end of each protrusion is on the opposite side of the pivot axis of the leg to the foot of the leg when viewed in plan view, thereby moving in the substantially opposite vertical direction. This ensures that each pair of adjacent legs react against motion in the same direction to provide support, but permit motion in opposite vertical directions to conform or articulate to a warped or uneven surface.

FIG. 7 shows the same mechanism as FIG. 6, but instead of the mechanism being close to the ground, the feet are replaced by downwards extending portions 5b, 6b, 7b and 8b connected to the outer ends of the beam portion of each leg. These downwards extending portions can look much like the fixed legs of a conventional table and can be an integral part of each leg, or separate parts joined to the beam portions to allow flat pack shipping of the mechanism and to allow different legs to be used. As each leg rotates about its pivot axis (through its respective bolt 9) to conform to uneven surfaces, using vertical legs can highlight any resulting difference in leg angle. To help avoid this, the downwards extending portion of each leg can be angled or made curved. The downwards extending portion 5b, 6b, 7b or 8b of each leg can be attached to the beam portion 5a, 6a, 7a or 8a of the leg at any point from the outer end as shown, to inside the pivot axis (through bolt 9), but the foot or ground contacting portion of the leg must be outside the pivot axis for the mechanism to operate correctly.

As with FIG. 5, a top cover can be used over the legs of the mechanism in FIGS. 6 and 7. However with the arrangements in FIGS. 6 and 7 the top cover can prevent each leg from folding down when the table is lifted off the ground without the need for an underside cover. The top cover can also provide the aesthetic and warp travel limit functions previously described. In FIG. 7, the underside of the object being supported can be or at least incorporate the top cover, so although no table top is shown on the mechanism in FIG. 7 for clarity, the provision of a table top can be used to provide a travel stop to limit the motion of each leg. Similarly, the base 4 could be incorporated into the object to be supported, i.e. tabs can be provided to locate the bolts 9 relative to the object being supported.

As discussed above, the protrusions can be attached to legs at any point, the important feature being that the free end is on the inside (towards the centre of the base in plan view) of the pivot axis of that leg and in contact with an adjacent leg outside of the pivot axis of that adjacent leg. Also as discussed above, the downwards extending portion of each leg can be attached to the leg at any point, the important feature being that the foot or ground contacting portion of the leg is outside the pivot axis in plan view.

Figure 8:
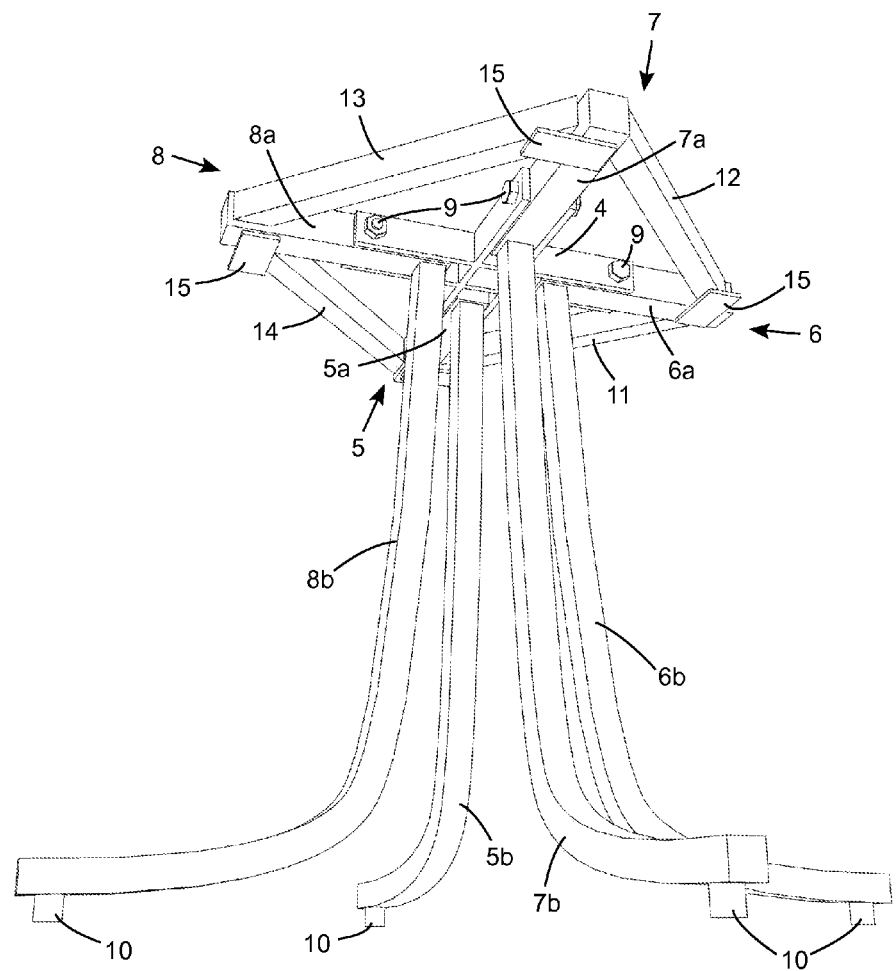

FIG. 8 illustrates a variation in the leg structure with the downwards extending portion (5b, 6b, 7b, or 8b) of each leg being connected to the inner end of the respective leg beam portion (5a, 6a, 7a or 8a) which in this case is inside the pivot axis through bolt 9, partially because bolt 9 is now spaced further out from the centre of the base 4. The spacing of the bolts 9 from the centre of the base affects the magnitude of the forces at the free ends of the protrusions 11, 12, 13 and 14, the closer the bolts are to the centre, the higher the forces required at the ends of the protrusions (to react the moment of the support force at the foot). Conversely, the further out the bolts are from the centre, although the forces at the free ends of the protrusions are reduced thereby reducing the moment on the bolt, as the vertical force at the pivot remains the same, these vertical support forces generate a higher moment into the base. The closer the pivot axes (ie the bolts) are to the centre of the base, the easier it is to resolve those support forces into the base and into any central support member such as a table stem. In Canadian patent application number 2216869, every embodiment includes outboard pivot connection points between arms and the base. The use of such outboard pivot connection points which resolve forces into the base at widely spaced generates unnecessarily high bending loads in the base requiring excessive material use to gain the required structural strength.

In the present invention, as shown in all of the Figures, the connection between each leg and the base is relatively inboard and the entire mechanism is well inboard of the feet or other ground engaging means providing not only structural and weight benefits, but also good knee or foot room providing comfort in use. The axes of the pivots connecting the legs to the base form a quadrilateral, each pivot being located on one side of that quadrilateral, i.e. the connection between each leg and the base is located (in plan view) between the axes of the pivots connecting both adjacent legs to the base.

Also in FIG. 8, the outer end of the beam portion 5a, 6a, 7a or 8a terminates at the connection to the protrusion 11, 12, 13 or 14. However, if the object being supported, such as a table top, extends out to or beyond the feet in plan view, and if it is providing a limit stop, it can be desirable to use longer beam portions to reduce the force on the table top (limit stop) if the table top has sufficient structural strength.

The downwards extending portions of each leg are shown sloping outwards at all points, so all legs are always diverging even when the feet of opposite legs move away from or particularly towards each other as the mechanism operates, thereby avoiding the appearance of misalignment. For the same reason, the pivot axis should be substantially horizontal and it should also be substantially perpendicular to the beam portion of the leg (if the foot is in line with the beam portion in plan view). Although the orientation of the pivot axis can vary from this preference and the mechanism will still operate, when downwards extending legs are used, the greater the deviation from horizontal and perpendicular, the greater the look of misalignment between opposite legs as the mechanism operates to accommodate a warped ground plane.

As with FIG. 7, the downwards extending portions of the legs may be detachable for shipping. In any of the Figures, the protrusions can be manufactured separately to the beam portions to allow shipping and then assembled for use. The legs can be shipped unattached to the base (i.e. disconnected at bolts 9) and assembled for use. Similarly, in FIGS. 1 to 6, the stem and base can be made detachable for packing and shipping for example, or the mechanism could be sold separately without any stem or table top, either to allow alternate stems and table tops to be chosen, or to use the mechanism to support an object other than a table, such as a chair, bench or cupboard.

The invention claimed is:

1. A support mechanism for supporting an object, the support mechanism including at least four legs and an interconnection means connecting the at least four legs, each leg including at least a beam portion having an inner end and an outer end, the beam portion of each leg being connected to the interconnection means by a respective pivot having a pivot axis, the pivot being located between the inner and outer ends of the beam portion, a protrusion being provided between each respective pair of adjacent legs, each protrusion being fixed to one leg of said pair of adjacent legs and extending from that one leg to act on another leg of said pair of adjacent legs, such that in use a support reaction force is transmitted between the pair of adjacent legs at a point on the other leg between the pivot and the outer end of the beam portion of that other leg, said point being on the opposite side of the pivot axis of the one leg to the outer end of the beam portion of that one leg, such that when in use the outer end of the beam portion of the one leg moves in an upwards direction, the protrusion fixed to the one leg acts on the other leg of the adjacent pair of legs such that the outer end of the beam portion of the other leg of the adjacent pair of legs moves in a downwards direction.

2. A support mechanism as claimed in claim 1 wherein the pivot of each leg is located between the pivot axes of two adjacent legs.

3. A support mechanism according to claim 1 wherein, four legs are provided being first, second, third and fourth legs, the pivot axes of the respective legs forming a quadrilateral in plan view.

4. A support mechanism according to claim 3 wherein the legs are arranged around the interconnection means in the order first, second, third then fourth, such that in plan view, the beam portions of the first and third legs are on opposing sides of the interconnection means and the second and fourth leg beam portions are on opposing sides of the interconnection means.

5. A support mechanism as claimed in claim 4 wherein the beam portions of the first and third legs in plan view are parallel to each other in use, and the second and fourth leg beam portions in plan view are parallel to each other and perpendicular to the first and third leg beam portions in use.

6. A support mechanism according to claim 4 wherein the respective protrusions comprise a first protrusion between the first and second leg, a second protrusion between the second and third leg, a third protrusion between the third and fourth leg and a fourth protrusion between the fourth and first leg, each protrusion ensuring substantially opposite vertical motion of the second ends of the beam portions of the associated legs.

7. A support mechanism according to claim 6 wherein the first and second protrusions extend from the second leg and the third and fourth protrusions extend from the fourth leg, the first protrusion being fixed to the second leg and acting on the first leg, the second protrusion being fixed to the second leg and acting on the third leg, the third protrusion being fixed to the fourth leg and acting on the third leg, and the fourth protrusion being fixed to the fourth leg and acting on the first leg.

8. A support mechanism according to claim 6 wherein the first protrusion extends from the first leg, the second protrusion extends from the second leg, the third protrusion extends from the third leg and the fourth protrusion extends from the fourth leg.

9. A support mechanism according to claim 1 wherein the interconnection means connect directly or indirectly to the object to be supported.

10. A support mechanism as claimed in claim 9 therein the interconnection means is connected to a table top to provide support therefore.

11. A support mechanism as claimed in claim 1 wherein a travel limit is provided, the travel limit being fixed in operation relative to the interconnection means to provide a physical limit to rotation of each leg about its pivot axis to thereby limit an articulation or warp displacement of the legs.

12. A support mechanism as claimed in claim 1 wherein each leg includes a ground engaging portion connected to the outer end of the beam portion of that leg.

13. A support mechanism as claimed in claim 1 wherein each leg includes a ground engaging portion extending downwards to a ground contact point, in use the ground contact point being located on the same side of the pivot axis of that leg as the outer end of the beam portion in plan view.

14. A table adaptable to uneven surfaces, the table including first, second, third, and fourth legs connected to a table top by interconnection means,
   each leg including a beam portion having an inner and an outer end, each beam portion being connected to interconnection means by a pivot having a pivot axis located between the inner and outer ends of the respective beam portion, the pivot axes of the four legs forming a quadrilateral in plan view,
   a first protrusion being provided between the first and second legs, fixed to the first or second leg and, in use, acting on the other of the first or second legs between the pivot and the outer end of the beam portion of said other of the first or second legs,
   a second protrusion being provided between the second and third legs fixed to the second leg and, in use, acting on the third leg between the pivot and the outer end of the beam portion of said third leg,
   a third protrusion being provided between the third and fourth legs, fixed to the third or fourth leg and, in use, acting on the other of the third of fourth legs between the pivot and the outer end of the beam portion of said other of the third or fourth legs,
   a fourth protrusion being provided between the fourth and first legs, fixed to the fourth leg and, in use, acting on the first leg between the pivot and the outer end of the beam portion of said first leg,
   the first, second, third and fourth protrusions each being provided to transfer forces between adjacent pairs of legs, and wherein during such that upward motion of the outer end of the beam portion of one leg of an adjacent pair a respective one of said protrusions provided between the adjacent pair to acts to cause a downward motion of the outer end of the other leg of that adjacent pair.

15. A table as claimed in claim 14 wherein the pivot of each respective leg is located on a respective side of said quadrilateral formed by the pivot axes of the legs.

16. A table according to claim 14 wherein the first protrusion is fixed to the first leg and acts on the second leg, and the third protrusion is fixed to the third leg and acts on the fourth leg.

17. A table according to claim 14 wherein the first protrusion is fixed to the second leg and acts on the first leg, and the third protrusion is fixed to the fourth leg and acts on the third leg.

18. A table according to claim 14 wherein a travel limit is provided, the travel limit being fixed in operation relative to the interconnection means to provide a physical limit to rotation of each leg about its pivot axis to thereby limit an articulation or warp displacement of the legs.

19. A table as claimed in claim 14 wherein the interconnection means includes a base portion and a stem portion.

20. A table as claimed in claim 14 wherein the beam portions of the first and third legs in plan view are located on opposite sides of the interconnection means and are parallel to each other in use, and
   the second and fourth leg beam portions are located on opposite sides of the interconnection means and are parallel to each other and perpendicular to the first and third leg beam portions.

21. A support mechanism for an object, the support mechanism including first, second, third and fourth legs connected to an interconnection means, each leg including a beam portion having an inner and an outer end,
   each beam portion being connected to the interconnection means by a pivot having a pivot axis located between the inner and outer ends of the respective beam portion, the pivot axes of the legs forming a quadrilateral in plan view and the pivot of each respective leg being located on a respective side of said quadrilateral, the beam portions of the first and third legs being located on opposite sides of the interconnection means in plan view and the beam portions of the second and fourth legs being located on opposite sides of the interconnection means in plan view,
   the second and fourth legs each further including protrusions fixed to the respective beam portion, the protrusions of the second leg, in use, act on the beam portions of both the first and third legs between the pivot, and the outer end of the beam portion of each of said first and third legs and the protrusions of the fourth leg, in use, act on the beam portions of both the first and third legs between the pivot and the outer end of the beam portion of each of said first and third legs, the protrusions of the second leg and the protrusions of the fourth leg each being provided such that upward motion of the outer end of the beam portion of one leg causes a, via the protrusions, downward motion of the outer ends of both adjacent legs.

* * * * *

UNITED STATES PATENT AND TRADEMARK OFFICE
CERTIFICATE OF CORRECTION

| | | |
|---|---|---|
| PATENT NO. | : 8,997,662 B2 | Page 1 of 1 |
| APPLICATION NO. | : 13/518579 | |
| DATED | : April 7, 2015 | |
| INVENTOR(S) | : Christopher Brian Heyring et al. | |

It is certified that error appears in the above-identified patent and that said Letters Patent is hereby corrected as shown below:

In the Claims

At Column 11, Claim 14, line 46, "during such that upward motion" should be -during upward motion-.
At Column 11, Claim 14, line 48, "pair a respective one" should be -pair, a respective one-.
At Column 11, Claim 14, line 49, "adjacent pair to acts to cause" should be -adjacent pair acts to cause-.

Signed and Sealed this
Twenty-eighth Day of July, 2015

Michelle K. Lee
*Director of the United States Patent and Trademark Office*